(12) United States Patent
Vans et al.

(10) Patent No.: US 8,326,079 B2
(45) Date of Patent: Dec. 4, 2012

(54) IMAGE DEFECT DETECTION

(75) Inventors: Marie Vans, Ft. Collins, CO (US); Sagi Schein, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 12/566,334

(22) Filed: Sep. 24, 2009

(65) Prior Publication Data

US 2011/0069894 A1 Mar. 24, 2011

(51) Int. Cl.
*G06K 9/00* (2006.01)
(52) U.S. Cl. ....................................................... 382/275
(58) Field of Classification Search .................... 382/275
See application file for complete search history.

(56) References Cited

U.S. PATENT DOCUMENTS

2003/0039402 A1* 2/2003 Robins et al. ................. 382/275

OTHER PUBLICATIONS

Ahmet, M. et al.,"Image Quality Measures and Their Performance", IEEE Transactions on Communications, vol. 43, No. 12, Dec. 1995.
Moganti, M. et al., "Automatic PCB Inspection Algorithms: A Survey", Computer Vision and Image Understanding, vol. 63, No. 2, pp. 287-313, 1996.
Wang, Z. et al., "Image Quality Assessment: From Error Measurement to Structural Similarity", IEEE Transactions on Image Processing, vol. 13, Jan 2004.
Wang, Z, et al., "Why is Image Quality Assessment So Difficult?", Proceedings of the IEEE International Conference on Acoust., Speech, and Signal Processing, 2004, vol. 4, pp.
Wang, Z. et al., "Image Quality Assessment: From Error Visibility to Structural Similarity", IEEE Transactions on Image Processing, vol. 13, No. 4, Apr. 2004.
Bill Smith, Making war on defects, IEEE Spectrum, vol. 30, No. 9, pp. 43-47, 1993.
Shang-Hong Lai, et al., An Accurate and Fast Pattern Localization Algorithm for Automated Visual Inspection, Real-Time Imaging, vol. 5, pp. 3-14, 1999.
Roland T. Chin, Automated Visual Inspection Algorithms, in Computer Vision: Theory and Industrial Applications, Ed. Carme Torras, pp. 377-404, 1992.
Byron E. Dom, et al. Recent advances in the automatic inspection of integrated circuits for pattern defects, Machine Vision and Applications, vol. 8, pp. 5-19, 1995.

* cited by examiner

*Primary Examiner* — Hadi Akhavannik

(57) ABSTRACT

Disclosed is a computer implemented method of detecting a defect in a printed image, the method comprising the steps of: receiving a target image comprising digital image data representing a scan of the printed image; receiving a reference image comprising digital image data representing a reference of the printed image; calculating a structural dissimilarity measure, D, associated with a target pixel located in the target image and a reference pixel located in the reference image; and, determining on the basis of the structural dissimilarity measure whether a defect is present at the target pixel, wherein the structural dissimilarity measure is calculated using a structural measure, s, and a contrast measure, c; the structural measure calculated using a spatial cross-correlation associated with a target region, $\vec{x}$, containing the target pixel and a reference region, $\vec{y}$, containing the reference pixel, and the contrast measure calculated using a standard deviation associated with the target region, and a standard deviation associated with the reference region.

19 Claims, 5 Drawing Sheets

IMAGE DEFECT DETECTION

FIELD

The present invention relates to methods and apparatus for detection of image defects and in particular, but not exclusively, to high speed defect detection for variable data printing applications.

BACKGROUND

Defects in printed images can be caused by a number of factors including anomalies in print media, interactions between print media and marking material, systematic errors introduced by print mechanisms or human error. Image defects may include but not be limited to scratches, spots, missing dot clusters, streaks, and banding.

Print defects are undesirable and efforts have been made in the art to develop suitable methods for their detection. Such techniques can broadly be categorised as manual (human) inspection or automated inspection. Human techniques are generally more time consuming than automated methods and studies have shown that even where the inspection process is structured and repeatable, manual inspection is only approximately 80% accurate [1]. Moreover, the time consuming nature of manual inspection is prohibitive in commercial printing applications where typically a printing press may operate at speeds in excess of two meters per second, necessitating fast inspection of printed images. Clearly, such inspection rates are beyond human capability.

Generally, automated inspection systems fall into one of three categories depending on the defect detection approach: (i) image reference (or template matching) approaches, (ii) design rule approaches, or (iii) some combination of both (hybrid approaches) [2-5]. In the simplest image reference approach, a reference exists that allows a direct comparison between a potentially defective image and a corresponding reference image. It is typical in this case to inspect 100% of the potentially defective image. A more elaborate referential approach involves recognizing features of potentially defective items in images and comparing those features with a set of idealized or perfect features. Inspection coverage on potentially defective items can vary in this case and may not necessarily be 100%. In the design-rule approach, a set of rules that describe properties of images are defined and can be statistically verified for a potentially defective image. In this case, as little as 10% of a product need be inspected before generating the appropriate statistics and determining whether a defect exists.

Automated inspection methods require substantial computational resources, and this requirement is exacerbated where variable data prints must be inspected for image defects. In variable data printing each image can be different and, if a referential approach is adopted, each image must be inspected in relation to a different reference image. For example, a customer job may require personalization of each print with a different name, address, or other information. In some applications it may be necessary to conduct inspection of all printed images (e.g. in the pharmaceutical industry 100% inspection is required for medicine labels).

In order to meet the demand for automated defect detection of variable data products, high-speed image detection methods and apparatus are desirable.

SUMMARY

In accordance with one aspect of the present invention, there is provided a computer implemented method of detecting a defect in a printed image, the method comprising the steps of: receiving a target image comprising digital image data representing a scan of the printed image; receiving a reference image comprising digital image data representing a reference of the printed image; calculating a structural dissimilarity measure, D, associated with a target pixel located in the target image and a reference pixel located in the reference image; and, determining on the basis of the structural dissimilarity measure whether a defect is present at the target pixel, wherein the structural dissimilarity measure is calculated using a structural measure, s, and a contrast measure, c; the structural measure calculated using a spatial cross-correlation associated with a target region, $\vec{x}$, containing the target pixel and a reference region, $\vec{y}$, containing the reference pixel, and the contrast measure calculated using a standard deviation associated with the target region, and a standard deviation associated with the reference region.

BRIEF DESCRIPTION OF THE DRAWINGS

Various features and advantages of the invention will become apparent from the following description of embodiments of the invention, given by way of example only, which is made with reference to the accompanying drawings, of which.

DETAILED DESCRIPTION OF THE INVENTION

Figure 1:
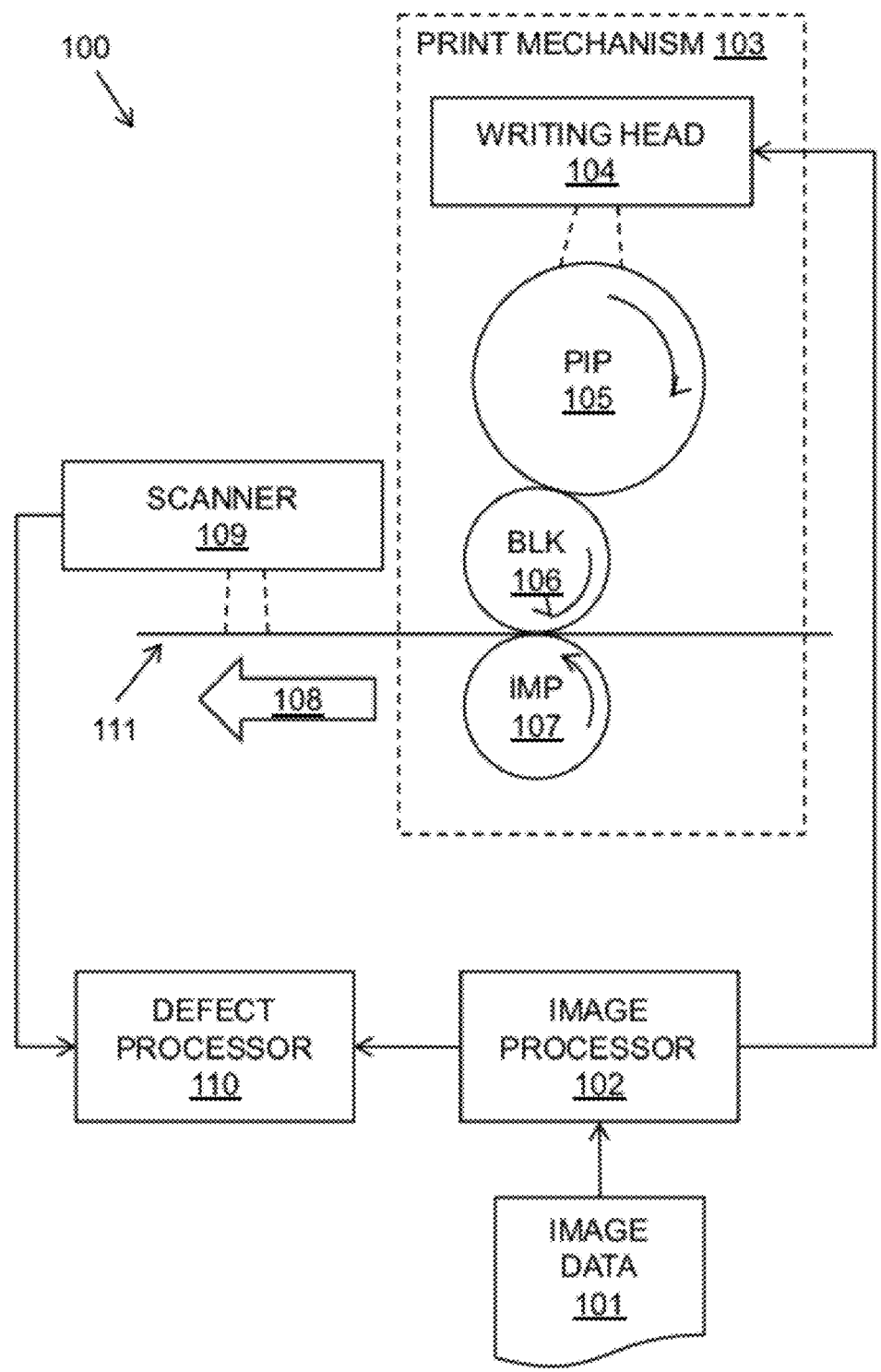
FIG. 1 is a diagram representing a system for detecting errors in a printed image in accordance with an embodiment of the invention.

Various embodiments of the present invention will now be described in more detail with reference to the accompanying drawings. It will be appreciated that the invention is not limited in its application to the details of the method and the arrangement of components as set forth in the following description or illustrated in the drawings. It will be apparent to a person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

FIG. 1 shows a system 100 for printing an image from image data 101 and detecting image defects in the resulting printed image 111 in accordance with an embodiment of the present invention. The system 100 comprises a print mechanism 103 which in turn comprises a writing head 104, a photo imaging plate (PIP) 105, a blanket drum (BLK) 106 and an impression drum (IMP) 107. The illustrated print mechanism 103 corresponds generally to that of an offset lithographic printer such as the HP Indigo Digital Press®. However, it will be appreciated that print mechanism 103 is provided for illustrative purposes only, and that any suitable mechanism for printing an image from image data may be used without departing from the scope of the present invention (e.g. laser printers, inkjet printers, dye-sublimation printers etc.). Also included in the system 100 is a scanner 109, a defect processor 110 and an image processor 102. In the present embodiment, the scanner 109 may be any device capable of converting an image on a print medium or product to digital image data.

Image data 101 is received by the image processor 102 which converts the image to a raster image suitable for the print mechanism 103 using established techniques. The raster image is sent to the print mechanism 103 and the writing head 104 produces the image on the PIP 105. In turn, the PIP transfers the image to the BLK 106 which then transfers the image onto a print medium or product such as sheet paper 111 on the IMP 107. Once the printed image exits the print mechanism 103 in direction 108, the scanner 109 captures the entire printed image on media 111 (either incrementally or as a whole) and sends the corresponding image data as a 'target image' to the defect processor 110. The image processor 102 also generates a 'reference image' associated with the image data 101 and sends the reference image to the defect processor 110. The defect process receives the target image and reference image and determines if one or more defects are present in the target image (and therefore the printed image) according to the method discussed below.

Figure 2:
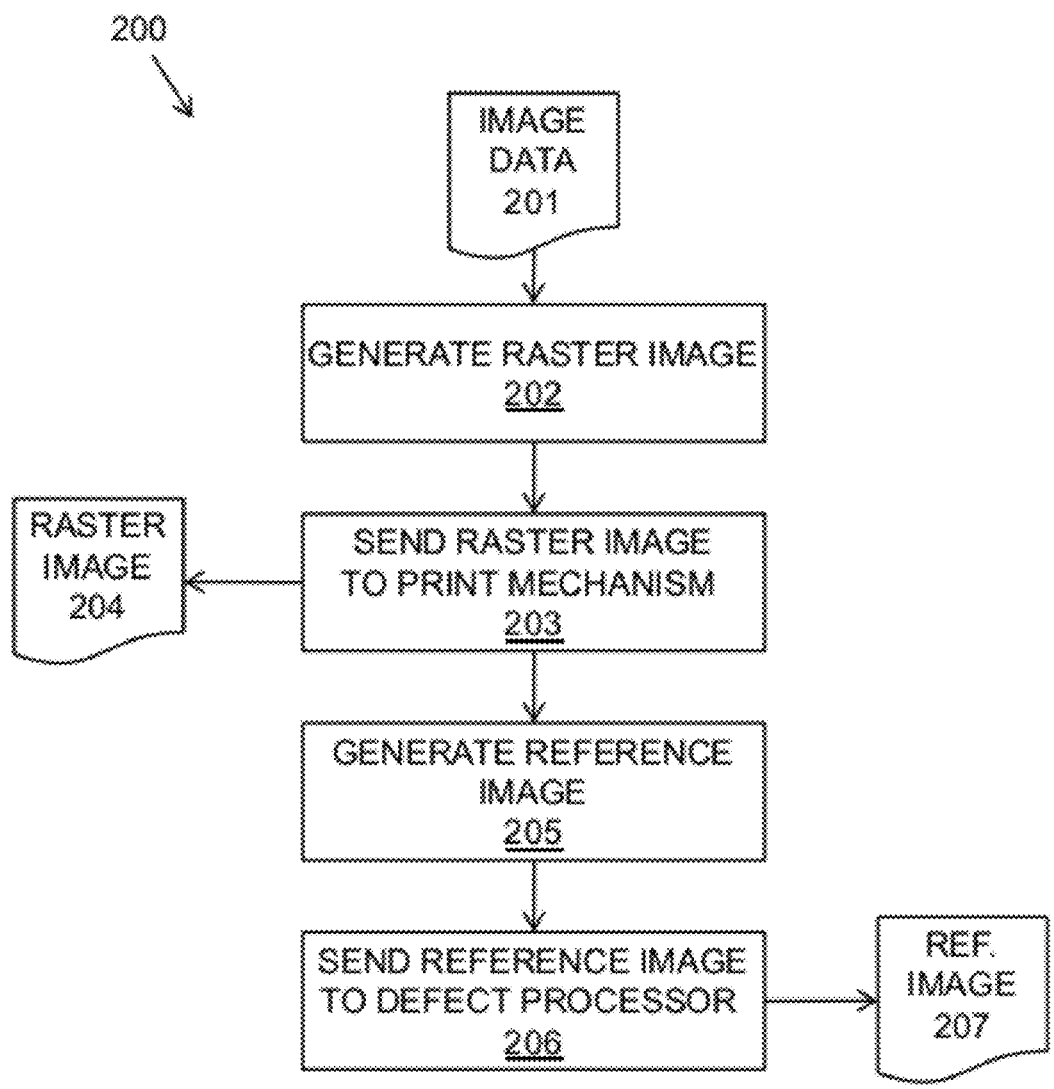
FIG. 2 is a flow diagram representing a method for generating a reference image and a raster image in accordance with an embodiment of the invention.

FIG. 2 illustrates a method 200 performed by the image processor 102 to produce the raster image sent to the print mechanism and the reference image sent to the defect processor 110 in accordance with an embodiment of the present invention. The image data 201 is received by the image processor which generates a raster image [step 202] and sends the raster image 204 to the print mechanism [step 203]. Next, the reference image 207 is generated by the image processor [step 205] and sent to the defect processor [step 206]. Typically, the raster image 204 is in a resolution and format appropriate for the print mechanism 103 employed. For example, for the HP Indigo Digital Press® the raster image may be generated at a resolution of 812 DPI in a CMYK (cyan, magenta, yellow, black) colour space. The reference image 207 is in a format suitable for the defect detection process, and this will typically be constrained by the scanner used and processing power available to the defect processor. In some embodiments it may be desirable to downscale the resolution of the reference image to match the image resolution produced by the scanner 109. For example, the scanner may be configured to operate at 150 DPI in a RGB (red, green, blue) colour space and in this instance the reference image would be generated to conform to this. It is envisaged that in alternative embodiments it may be the target image which is processed to match the format and resolution of the reference image. In further embodiments, both the reference image and the target image may be processed to conform to a mutual format and resolution.

At this stage, the defect processor 110 has received two processed images in substantially the same colour space and substantially the same resolution—the reference image corresponding to the original image data, and a target image corresponding to a scan of the printed image 111. However, it will be understood by those skilled in the art that the processing of the original image to produce the reference image may be performed by the defect processor 110 itself, rather than the image processor. In a further embodiment, it is envisaged that one or more additional dedicated processors may be employed to process the target and reference images prior to them being received by the defect processor 110.

Figure 3:
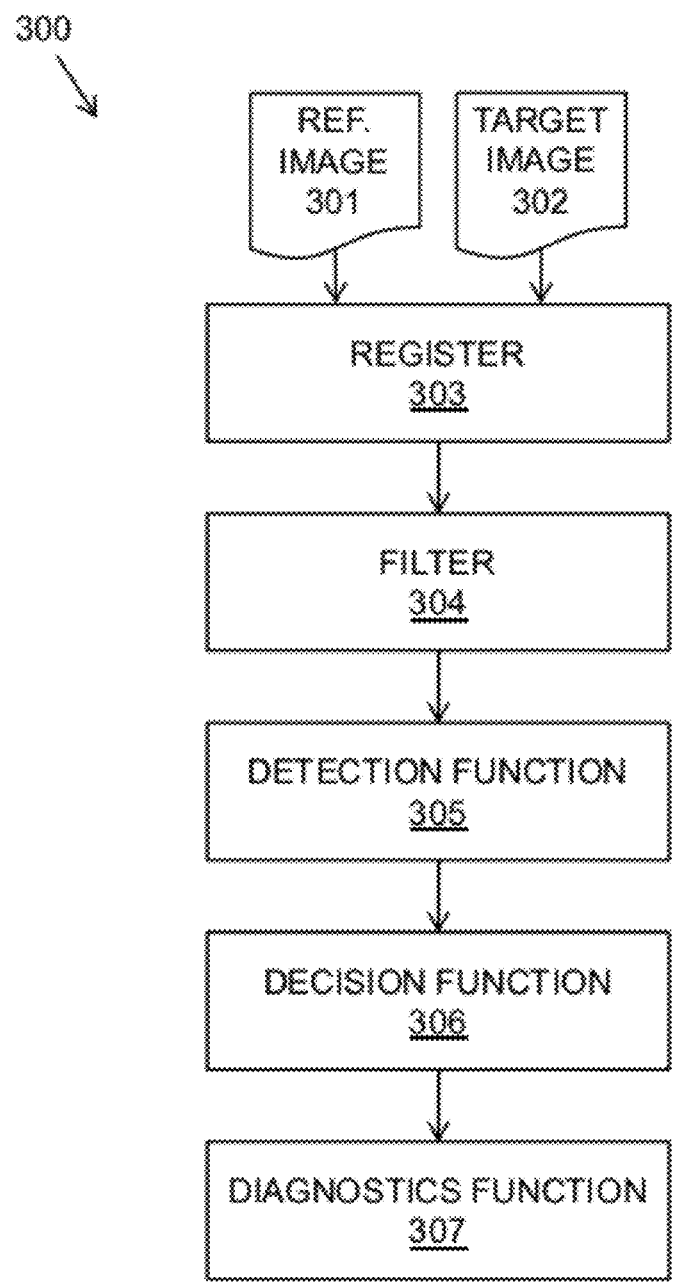
FIG. 3 is a flow diagram representing a method for detecting errors in a printed image in accordance with an embodiment of the invention.

FIG. 3 shows a method 300 performed by the defect processor 110 for detecting a defect in accordance with an embodiment of the invention. The reference image 301 and target image 302 are in substantially the same colour format at substantially the same resolution. First, the reference image 301 and target image 302 are registered [step 303] to align the image to enable accurate error detection. Misalignment may occur, for example, due to systematic hardware deficiencies or variations in paper position on exit from the print mechanism 103. Next, one or both of the registered images are filtered (e.g. smoothed and/or sharpened) [step 304] so that the target and reference images can be compared. Typically, the filtering process [step 304] will include sharpening of the target image and softening of the reference image edges to increase the likelihood of obtaining accurate defect detection. Following this step, defect detection is performed [step 305] to produce a defect map which is sent to a decision function. The decision function analyses the defect map and decides if one or more defects are present in the image [step 306], and if so, determines an appropriate course of action which may include halting the printing process and/or alerting an operator. Optionally, a diagnostics function may analyse the defect map in order to determine the cause and possibly fix the cause of the error [step 307]. Alternatively or additionally, the diagnostics function [step 307] may be used to keep a log of defects for maintenance scheduling and determining whether an equipment problem is imminent.

Registration of the reference image and target image [step 303] can be achieved using any suitable registration method as is known in the art, and it will be appreciated by the skilled person that the scope of the present invention is not restricted to a specific registration method.

Following registration, defect detection is applied to the registered reference and target images. The defect detection function implements a structural dis-similarity information measure (DSIM) on a pixel-by-pixel basis. The DSIM is based on the precept that every region in the target image should have a similar region nearby in the reference image, unless it contains a defect. The DSIM is based on the structural similarity information measure (SSIM) [6] which is based on the premise that human visual perception is highly adapted for extracting structural information from an image. The most prevalent similarity measures, such as difference or sum squared error, are easy to understand and use, but they do not correspond well to perceived visual quality [7,8]. The defect detection function uses ideas from SSIM, which assigns a similarity value, S, to two images according to:

$$S(\vec{x},\vec{y})=f(l(\vec{x},\vec{y}),c(\vec{x},\vec{y}),s(\vec{x},\vec{y})), \qquad (1)$$

where $\vec{x}$ and $\vec{y}$ are image signals corresponding to a target region in the target image and a reference region in the reference image respectively. The SSIM has three components: a luminance measure, l, which compares the mean values of the two regions; a contrast measure, c, which compares the standard deviation of the two regions, and a structural measure, s, which compares the correlation of the two regions. These three measure are based on properties of the image pair, including the signal mean, $\mu_x$:

$$\mu_x = \frac{1}{N}\sum_{i=1}^{N} x_i, \qquad (2)$$

the signal standard deviation, $\sigma_x$:

$$\sigma_x = \left(\frac{1}{N-1}\sum_{i=1}^{N}(x_i - \mu_x)^2\right)^{\frac{1}{2}}, \quad (3)$$

and a signal cross correlation, $\sigma_{xy}$:

$$\sigma_{xy} = \left(\frac{1}{N-1}\sum_{i=1}^{N}(x_i - \mu_x)(y_i - \mu_y)\right)^{\frac{1}{2}}. \quad (4)$$

where summations are over all pixels in the relevant regions and N is the total number of pixels in a region. Based on these properties, the luminance measure, l, is defined as:

$$l(\vec{x}, \vec{y}) = \frac{2\mu_x\mu_y + C_1}{\mu_x^2 + \mu_y^2 + C_1}, \quad (5)$$

where $C_1$ is a constant. The contrast measure, c, is defined as:

$$c(\vec{x}, \vec{y}) = \frac{2\sigma_x\sigma_y + C_2}{\sigma_x^2 + \sigma_y^2 + C_2}, \quad (6)$$

where $C_2$ is a constant. Finally, the structure measure, s, is defined as:

$$s(\vec{x}, \vec{y}) = \frac{2\sigma_{xy} + C_3}{\sigma_x\sigma_y + C_3} \quad (7)$$

where $C_3$ is a constant. The constant $C_1$, may take a standard value [6] according to:

$$C_1 = (K_1 L)^2, \quad (8)$$

where L is the dynamic range of the pixel values (255 for 8-bit grayscale images), and $K_1 \ll 1$ is a small constant. Constant $C_2$ may take a value according to:

$$C_2 = (K_2 L)^2, \quad (9)$$

where $K_2 \ll 1$ is also a small constant. Finally, $C_3$ may take the value:

$$C_3 = C_2/2, \quad (10)$$

It will be appreciated by those skilled in the art that the various constants may be varied as appropriate for a particular application or image type. Such variation is intended to fall within the scope of the present application, as defined by the appended claims.

The SSIM was originally developed to provide a measure of similarity between an original digital image and a digitally processed image thereof (e.g. JPEG compression). In such circumstances, SSIM has proved a useful measure of overall objective image quality for predicting perceived image quality. However, experiments conducted by the applicant have shown that SSIM does not provide accurate results when employed to detect perceptible defects in printed images. In particular, experiments conducted by the applicant have shown that whilst luminance is helpful for finding the closest pixel match, it is actually a hindrance when trying to determine if a defect exists at a pixel. Thus, ignoring mean differences when looking for true defects reduces luminance fluctuations which may otherwise show as defects. Such fluctuations may be introduced by systematic errors inherent to the scanning process. Thus, for the purposes of detecting printed image defects, the DSIM has been developed which is based on a contrast measure and a structure measure, and is substantially independent of a luminance measure. In one embodiment, the DSIM takes the form:

$$D = |(1 - c(\vec{x}, \vec{y})) \times s(\vec{x}, \vec{y})|, \quad (11)$$

where the contrast measure, c, and the structure measure, s, are calculated as described above.

The constants $C_2$ & $C_3$ used for the DSIM may be adjusted to suit a particular application of the defect detection method. However, it has been found that under most circumstances the same constant values as those defined for SSIM provide acceptable results.

Figure 4:
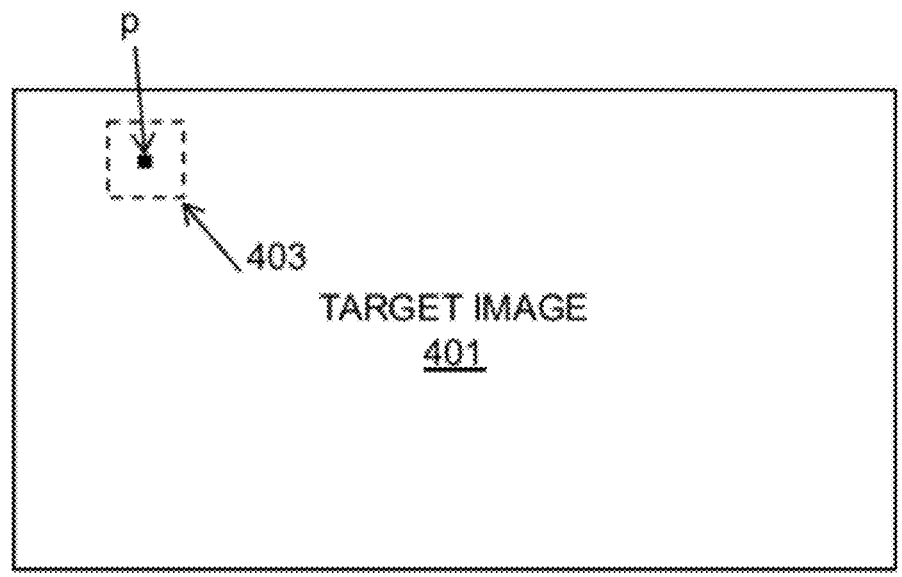
FIG. 4 is a diagram showing determination of the reference region location in an image in accordance with an embodiment of the invention.
Figure 4:
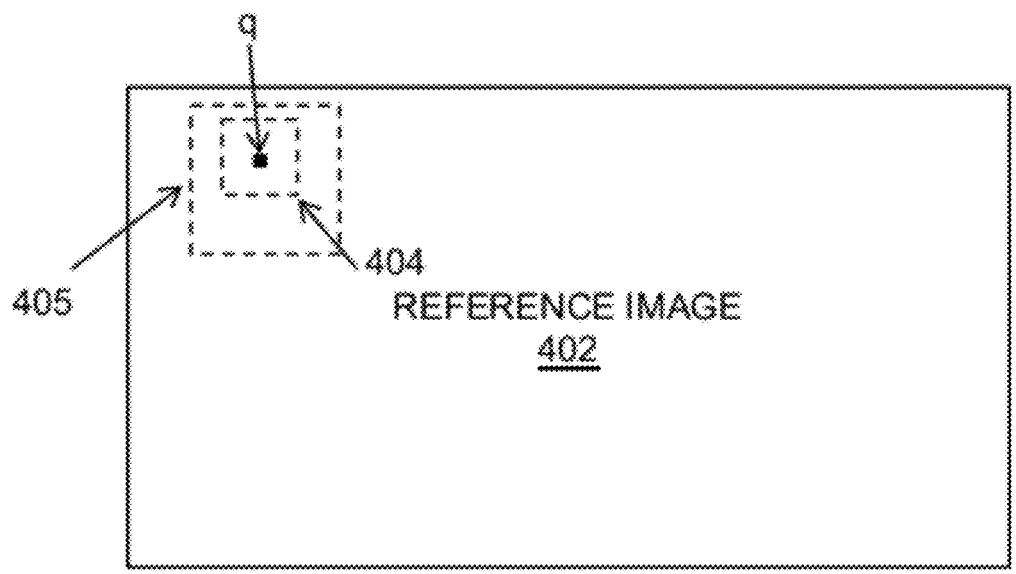

Turning now to FIG. 4, the defect detection process is illustrated for a target image 401 and a reference image 402. FIG. 4 shows a pixel p in the target image 401 which is located centrally in a k by k target region 403. Similarly, the reference image 402 contains a pixel q contained in a k by k reference region 404. In some embodiments, reference pixel q may simply correspond to pixel at the identical location to pixel p. However, due to the inherent variability introduced by the scanning process it is generally more accurate to perform an additional local registration for each pixel. In the illustrated embodiment, a window 405 of size w by w is defined. Next, the window 405 is searched to find the 'best match' reference region. Once the reference region is determined, the central pixel is taken to be pixel q and the DSIM can be calculated.

The 'best match' reference region is determined using the SSIM measure. The SSIM for each k by k region in window 404 is calculated and the region with the highest SSIM is selected as the target region. In an ideal system where the images are registered exactly no defects exist and pixel q will be in the location corresponding to that of pixel p in the target image. Conversely, where a defect exists at pixel p, the best matching reference region will be a poor match and the associated DSIM will likely indicate the presence of a defect at this position.

Following determination of the 'best match' reference region and consequently the location of reference pixel q, the defect detection process calculates the DSIM, D, associated with the target pixel, p, and reference pixel, q, according to equation (8) above. The process of determining the 'best match' region and then calculating the DSIM can be summarised as follows:

For each pixel 'p' in target image:
k by k frame: x=x(p), centred at p
1. Find best matching k×k pixel frame y=y(p) in reference image within window of size w by w using S.
2. Compute D on basis of best matching frame.

The DSIM is calculated for all the pixels in the target image, or a subset thereof, and the result is used to produce a defect image comprising the DSIM values for each pixel. A threshold is applied to the defect image to obtain a binary defect map (an appropriate threshold value may be determined empirically and a value of 0.5 has been found to produce acceptable results).

Figure 5:
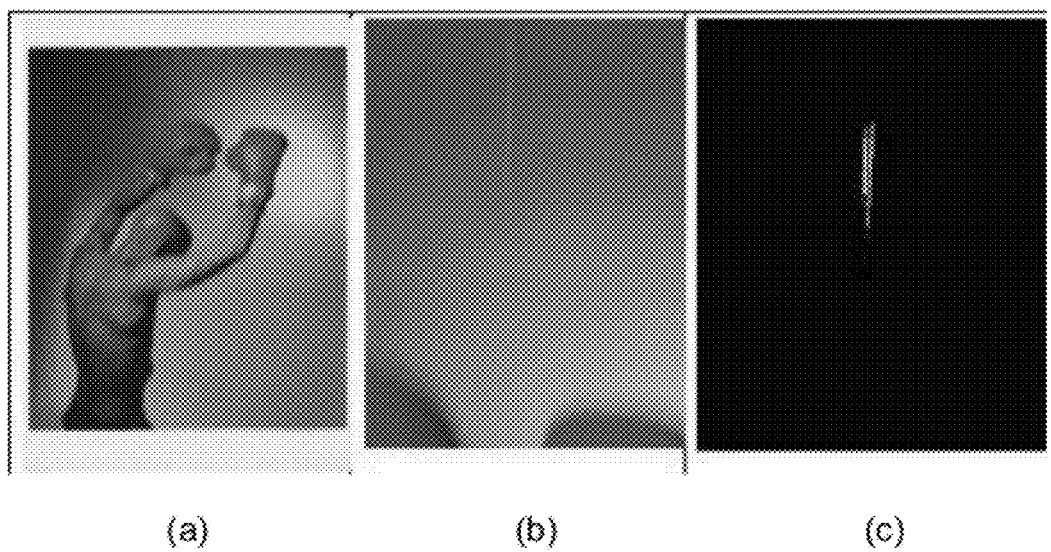
FIG. 5 is a diagram showing a target image, a defect in the target image, and a defect map generated for the target image in accordance with an embodiment of the invention.

For example, FIG. 5(a) illustrates a typical target image and FIG. 5(b) contains the portion of the target image (above the boxer's raised gloves) containing a defect in the green channel. FIG. 5(c) shows the defect map following application of a threshold, generated in accordance with an embodiment of the invention. The small defect can clearly be seen and easily detected as a defect.

A further part of the system involves notifying the operator that a defect has occurred and optionally the seriousness of it (for example, press-stopping or not). This functionality is performed by the decision function 306 which takes results generated by the detection function (e.g. the defect map and/or defect image). In the case of the binary defect map, analysis techniques such as morphological filtering or median filtering can be applied efficiently to reduce the noise and remove visually imperceptible defects. In one embodiment of the invention, projections in both the horizontal and vertical directions on the pre or post filtered defect map are performed to determine if human visible defects occur on the page. For example, if a predetermined number of consecutive pixels (e.g. two or more) in a row or column of the defect map are defective, this may be flagged as a visible defect. Size and shape of the defect may be used to determine whether the defect warrants an automatic shut-down of the machine or triggers a warning to the operator without affecting the current print job. In the event of a defect, the defect map can also help with diagnosis and repair. In some embodiments, the defect map (with or without the target image data and/or defect image), can be passed to a diagnosis system for further analysis and recovery procedures.

In some embodiments, the defect detection system is required to operate with a variable data printing system. In such systems every page is potentially different and, as a result, defect detection needs to operate in real-time. This requirement translates to a processing rate of at least one page per second for current industrial printing systems. The DSIM method is particularly advantageous as it offers ease of parallelisation using hardware such as Graphics Processing Units (GPU). For a particular target pixel, the local registration, DSIM and SSIM operations depend only on a small number of nearby pixels, and the computation is order independent. Moreover the algorithm is compute-intensive and not memory bounded. These characteristics make DSIM a candidate for acceleration on a GPU.

The defect detection method described hereinbefore can be implemented using the CUDA® computing interface from Nvidia®. The CUDA® interface gives the programmer low level access to the computational capacity of the GPU. The implementation achieves parallelism that is dictated by the number of processing units in the GPU. To reduce memory access each image is stored in texture data storage which is cached and optimized for a two-dimensional memory access pattern. Additionally, DSIM for each pixel is computed for each colour channel independently. This significantly improves the memory access time since each pixel is only accessed once. After the DSIM for each colour channel is computed their values are combined with a logical OR operator to yield the final DSIM decision.

Whilst the above described embodiments relate to detection of defects in images printed on print media, it will be understood that further embodiments of the invention may equally be applied to images printed onto products including, but not limited to web paper, fabric, polymer substrate or silicon substrate. Indeed, in some embodiments of the invention, the image may be printed using a functional marking material to produce, for example, an electrical circuit or component. In such applications, a detection of defects is desirable if circuit malfunctions are to be avoided. Therefore, it will be understood by a person of normal skill in the art that the term 'image' as used herein is not limited to an image printed on conventional print media or using conventional marking material, but may extend to any optically, electrically or physically formed reproduction.

For purposes of simplicity of explanation, the illustrated methodologies have been shown and described as a series of functional blocks. It will be appreciated by those of ordinary skill in the art that the methodologies are not limited by the order of the blocks, as some blocks can occur in different orders and/or concurrently with other blocks from that shown and described. Moreover, fewer than all the illustrated blocks may be required to implement an example methodology. It will be further appreciated that electronic and software applications may involve dynamic and flexible processes so that the illustrated blocks can be performed in other sequences that are different from those shown and/or that blocks may be combined or separated into multiple components. The methods and processes described hereinbefore may be implemented using various programming approaches like machine language, procedural, object oriented and/or artificial intelligence techniques.

The above embodiments are to be understood as illustrative examples of the invention. Further embodiments of the invention are envisaged. For example, selection of the 'best match' reference region could be performed using the average region luminance (rather than SSIM) or other suitable measure as is known in the art. Alternatively or additionally, in some embodiments, the defect detection method could be applied to each colour separation separately. Moreover, further embodiments of the invention may be combined with further defect detection algorithms. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method of detecting a defect in a printed image, the method comprising:
   receiving a target image comprising digital image data representing a scan of the printed image;
   receiving a reference image comprising digital image data representing a reference of the printed image;
   calculating a structural dissimilarity measure, D, associated with a target pixel located in the target image and a reference pixel located in the reference image; and,
   determining on the basis of the structural dissimilarity measure whether a defect is present at the target pixel,
   wherein the structural dissimilarity measure is calculated using a structural measure, s, and a contrast measure, c;
   the structural measure calculated using a spatial cross-correlation associated with a target region, $\vec{x}$, containing the target pixel and a reference region, $\vec{y}$, containing the reference pixel, and the contrast measure calculated using a standard deviation associated with the target region, and a standard deviation associated with the reference region, and
   wherein the structural dissimilarity measure is independent of a luminance measure.

2. A method according to claim 1, wherein the spatial cross-correlation is a spatial intensity cross-correlation associated with the target region and the reference region.

3. A method according to claim 1, wherein the structural dissimilarity measure is calculated according to:

$$D|[1-c(\vec{x},\vec{y})] \times s(\vec{x},\vec{y})|.$$

4. A method according to claim 3 wherein the structural measure is calculated as:

$$s(x,y) = \frac{2\sigma_{xy} + C_3}{\sigma_x \sigma_y + C_3},$$

where $C_3$ is a constant and:

$$\sigma_x = \left(\frac{1}{N-1}\sum_{i=1}^{N}(x_i - \mu_x)^2\right)^{\frac{1}{2}}$$

and $$\sigma_{xy} = \left(\frac{1}{N-1}\sum_{i=1}^{N}(x_i - \mu_x)(y_i - \mu_y)\right)^{\frac{1}{2}}.$$

5. A method according to claim 4, wherein the contrast measure is calculated as:

$$c(\vec{x},\vec{y}) = \frac{2\sigma_x \sigma_y + C_2}{\sigma_x^2 + \sigma_y^2 + C_2}, \quad (6)$$

where $C_2$ is a constant.

6. A method according to claim 5, wherein the method further comprises registration of the target region with the reference region.

7. A method according to claim 6, wherein registration is performed on the basis of a structural similarity measure, S, between the target region and the reference region.

8. A method according to claim 7, wherein registration comprises calculating the structural similarity measure, S, associated with the target region and each of a plurality of reference regions within a window of predetermined size in the reference image, and selecting the target region as a best matched reference region on the basis of the calculated structural similarity measure.

9. A method according to claim 7, wherein the structural similarity measure is calculated according to:

$$S(\vec{x},\vec{y}) = f(l(\vec{x},\vec{y}), c(\vec{x},\vec{y}), s(\vec{x},\vec{y}))$$

where $l$ is a luminance measure calculated according to:

$$l(\vec{x},\vec{y}) = \frac{2\mu_x \mu_y + C_1}{\mu_x^2 + \mu_y^2 + C_1},$$

where $C_1$ is a constant.

10. A method according to claim 9, wherein the method further comprises generating a defect map on the basis of a plurality of structural dissimilarity measures calculated for a plurality of pixels in the target image.

11. A method according to claim 10, wherein the defect map is generated by applying a predetermined threshold to the plurality of structural dissimilarity measures to produce a binary map.

12. A method according to claim 11, wherein the method further comprises filtering the defect map to remove visually imperceptible defects and/or systematic errors.

13. A method according to claim 11, wherein the method further comprises performing a projection in the horizontal and vertical directions of the defect map and triggering a defect warning upon a determination that more than a predetermined pixels are 'on' in a row or column.

14. A defect detection apparatus to detect a defect in a printed image, the apparatus to:
receive a target image comprising digital image data representing a scan of the printed image;
receive a reference image comprising digital image data representing a reference of the printed image;
calculate a structural dissimilarity measure, D, associated with a target pixel located in the target image and a reference pixel located in the reference image; and,
determine on the basis of the structural dissimilarity measure whether a defect is present at the target pixel,
wherein the structural dissimilarity measure is calculated using a structural measure, s, and a contrast measure, c;
the structural measure is calculated using a spatial cross-correlation associated with a target region, $\vec{x}$, containing the target pixel and a reference region, $\vec{y}$, containing the reference pixel, and the contrast measure is calculated using a standard deviation associated with the target region, and a standard deviation associated with the reference region and
wherein the structural dissimilarity measure is independent of a luminance measure.

15. A system for detecting to detect a defect in a printed image, the system comprising:
a defect detection apparatus to:
receive a target image comprising digital image data representing a scan of the printed image;
receive a reference image comprising digital image data representing a reference of the printed image;
calculate a structural dissimilarity measure, D, associated with a target pixel located in the target image and a reference pixel located in the reference image; and,
determine on the basis of the structural dissimilarity measure whether a defect is present at the target pixel,
wherein the structural dissimilarity measure is calculated using a structural measure, s, and a contrast measure, c;
the structural measure calculated using a spatial cross-correlation associated with a target region, $\vec{x}$, containing the target pixel and a reference region, $\vec{y}$, containing the reference pixel, and the contrast measure calculated using a standard deviation associated with the target region, and a standard deviation associated with a reference region and
wherein the structural dissimilarity measure is independent of a luminance measure; and,
a scanning apparatus to scan the printed image to a target image and to send the target image to the defect detection apparatus.

16. A non-transitory computer readable medium containing instructions stored thereon for enacting a method of detecting a defect in a printed image, the instructions to cause a computer to:
receive a target image comprising digital image data representing a scan of the printed image;
receive a reference image comprising digital image data representing a reference of the printed image;

calculate a structural dissimilarity measure, D, associated with a target pixel located in the target image and a reference pixel located in the reference image; and, determine on the basis of the structural dissimilarity measure whether a defect is present at the target pixel, wherein the structural dissimilarity measure is calculated using a structural measure, s, and a contrast measure, c; the structural measure is calculated using a spatial cross-correlation associated with the target region, $\vec{x}$, containing the target pixel and a reference region, $\vec{y}$, containing the reference pixel, and the contrast measure is calculated using a standard deviation associated with the target region, and a standard deviation associated with the reference region and wherein the structural dissimilarity measure is independent of a luminance measure.

17. A defect detection apparatus according to claim 14, wherein the structural dissimilarity measure is calculated according to:

$$D=|[1-c(\vec{x},\vec{y})]\times s(\vec{x},\vec{y})|.$$

18. A system according to claim 15, wherein the structural dissimilarity measure is calculated according to:

$$D=|[1-c(\vec{x},\vec{y})]\times s(\vec{x},\vec{y})|.$$

19. A non-transitory computer readable medium according to claim 16, wherein the structural dissimilarity measure is calculated according to:

$$D=|[1-c(\vec{x},\vec{y})]\times s(\vec{x},\vec{y})|.$$

* * * * *

UNITED STATES PATENT AND TRADEMARK OFFICE
CERTIFICATE OF CORRECTION

PATENT NO. : 8,326,079 B2
APPLICATION NO. : 12/566334
DATED : December 4, 2012
INVENTOR(S) : Marie Vans et al.

It is certified that error appears in the above-identified patent and that said Letters Patent is hereby corrected as shown below:

In column 9, line 4, in Claim 3, delete "$D|[1-c(\vec{x},\vec{y})] \times s(\vec{x},\vec{y})|$" and insert -- $D|[1-c(\vec{x},\vec{y})] \times s(\vec{x},\vec{y})|$ --, therefor.

In column 9, line 51, in Claim 9, delete "$S(\vec{x},\vec{y})=f(l(\vec{x},\vec{y}),c(\vec{x},\vec{y}),s(\vec{x},\vec{y}))$" and insert -- $S(\vec{x},\vec{y}) = f(l(\vec{x},\vec{y}), c(\vec{x},\vec{y}), s(\vec{x},\vec{y}))$ --, therefor.

In column 9, line 52, in Claim 9, delete "where/is" and insert -- where $l$ is --, therefor.

In column 10, line 30, in Claim 14, delete "region" and insert -- region, --, therefor.

In column 10, line 33, in Claim 15, after "system" delete "for detecting".

In column 10, line 54, in Claim 15, delete "region" and insert -- region, --, therefor.

In column 11, line 15, in Claim 16, delete "region" and insert -- region, --, therefor.

Signed and Sealed this
Ninth Day of April, 2013

Teresa Stanek Rea
*Acting Director of the United States Patent and Trademark Office*